(12) United States Patent
Wu et al.

(10) Patent No.: US 12,505,561 B2
(45) Date of Patent: Dec. 23, 2025

(54) CONTROL CHIP AND DYNAMIC IMAGE JUDGMENT METHOD

(71) Applicant: Nuvoton Technology Corporation, Hsinchu Science Park (TW)

(72) Inventors: Chih-Yuan Wu, Hsinchu County (TW); Tzu-Lan Shen, Taoyuan (TW); Cheng-Hui Chen, Hsinchu County (TW)

(73) Assignee: NUVOTON TECHNOLOGY CORPORATION, Hsinchu Science Park (TW)

( * ) Notice: Subject to any disclaimer, the term of this patent is extended or adjusted under 35 U.S.C. 154(b) by 285 days.

(21) Appl. No.: 18/511,017

(22) Filed: Nov. 16, 2023

(65) Prior Publication Data

US 2024/0212169 A1 Jun. 27, 2024

(30) Foreign Application Priority Data

Dec. 21, 2022 (TW) .................................. 111149143

(51) Int. Cl.
*G06T 7/223* (2017.01)
*G06T 1/20* (2006.01)
*H04N 23/80* (2023.01)

(52) U.S. Cl.
CPC ............ *G06T 7/223* (2017.01); *G06T 1/20* (2013.01); *H04N 23/80* (2023.01); *G06T 2200/28* (2013.01); *G06T 2207/20021* (2013.01)

(58) Field of Classification Search
None
See application file for complete search history.

(56) References Cited

U.S. PATENT DOCUMENTS 8,054,315 B2 * 11/2011 Owen ...................... G06T 1/60
345/542
2005/0213661 A1 * 9/2005 Xiang .................... H04N 19/43
375/E7.101

FOREIGN PATENT DOCUMENTS

| CN | 104964788 A | 10/2015 |
| CN | 216122583 U | 3/2022 |
| TW | 2012/50519 A | 12/2012 |

* cited by examiner

*Primary Examiner* — Darryl V Dottin
(74) *Attorney, Agent, or Firm* — MUNCY, GEISSLER, OLDS & LOWE, P.C.

(57) ABSTRACT

A control chip coupled to a central processing unit (CPU) and including a selection circuit, a buffer circuit, a calculation circuit, and a motion judgment circuit is provided. The selection circuit selects some of the first image macro-blocks of a first image frame and some of the second image macro-blocks of a second image frame. The buffer circuit stores the selected first and second image macro-blocks. The calculation circuit accesses the buffer circuit and calculates the differences between the selected first and second image macro-blocks to generate a calculated result. The motion judgment circuit determines whether the first and second image frames are the same according to the calculated result. In response to the second image frame not being the same as the first image frame, the motion judgment circuit wakes up the CPU so that the CPU enters a normal mode from a low-power mode.

20 Claims, 7 Drawing Sheets

CONTROL CHIP AND DYNAMIC IMAGE JUDGMENT METHOD

CROSS REFERENCE TO RELATED APPLICATIONS

This Application claims priority of Taiwan Patent Application No. 111149143, filed on Dec. 21, 2022, the entirety of which is incorporated by reference herein.

BACKGROUND OF THE INVENTION

Field of the Invention

The present invention relates to a control chip, and, in particular, to a control chip that wakes a central processing unit (CPU) up according to an external image.

Description of the Related Art

With technological development, the types and functions of electronic devices have increased. To reduce power consumption, more electronic devices auto-enter a low-power mode when these electronic devices are idle. However, in the low-power mode, the electronic devices cannot perform normal operations such as monitoring a specific space for the presence of a moving object.

BRIEF SUMMARY OF THE INVENTION

In accordance with an embodiment of the disclosure, a control chip coupled to a central processing unit (CPU) and comprises a selection circuit, a buffer circuit, a calculation circuit, and a motion judgment circuit. The selection circuit receives a first image frame and a second image frame and selects some of first image macro-blocks of the first image frame and some of second image macro-blocks of the second image frame. The buffer circuit stores the selected first image macro-blocks and the selected second image macro-blocks. The calculation circuit accesses the buffer circuit and calculates the differences between the selected first image macro-blocks and the selected second image macro-blocks to generate a first calculated result. The motion judgment circuit determines whether the second image frame is the same as the first image frame according to the first calculated result. In response to the second image frame not being the same as the first image frame, the motion judgment circuit wakes up the CPU so that the CPU enters a normal mode from a low-power mode.

A dynamic image judgment method for a CPU operating in a low-power mode is provided and is described in the following paragraph. A first image frame and a second image frame are received. Some of image macro-blocks of the first image frame and some of image macro-blocks of the second image frame are compared to determine whether the second image frame is the same as the first image frame. In response to the second image frame not being the same as the first image frame, the CPU is woken up and then exits the low-power mode.

Dynamic image judgment method may be practiced by the control chip which have hardware or firmware capable of performing particular functions and may take the form of program code embodied in a tangible media. When the program code is loaded into and executed by an electronic device, a processor, a computer or a machine, the electronic device, the processor, the computer or the machine becomes a control chip for practicing the disclosed method.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The present invention will be described with respect to particular embodiments and with reference to certain drawings, but the invention is not limited thereto and is only limited by the claims. The drawings described are only schematic and are non-limiting. In the drawings, the size of some of the elements may be exaggerated for illustrative purposes and not drawn to scale. The dimensions and the relative dimensions do not correspond to actual dimensions in the practice of the invention.

Figure 1:
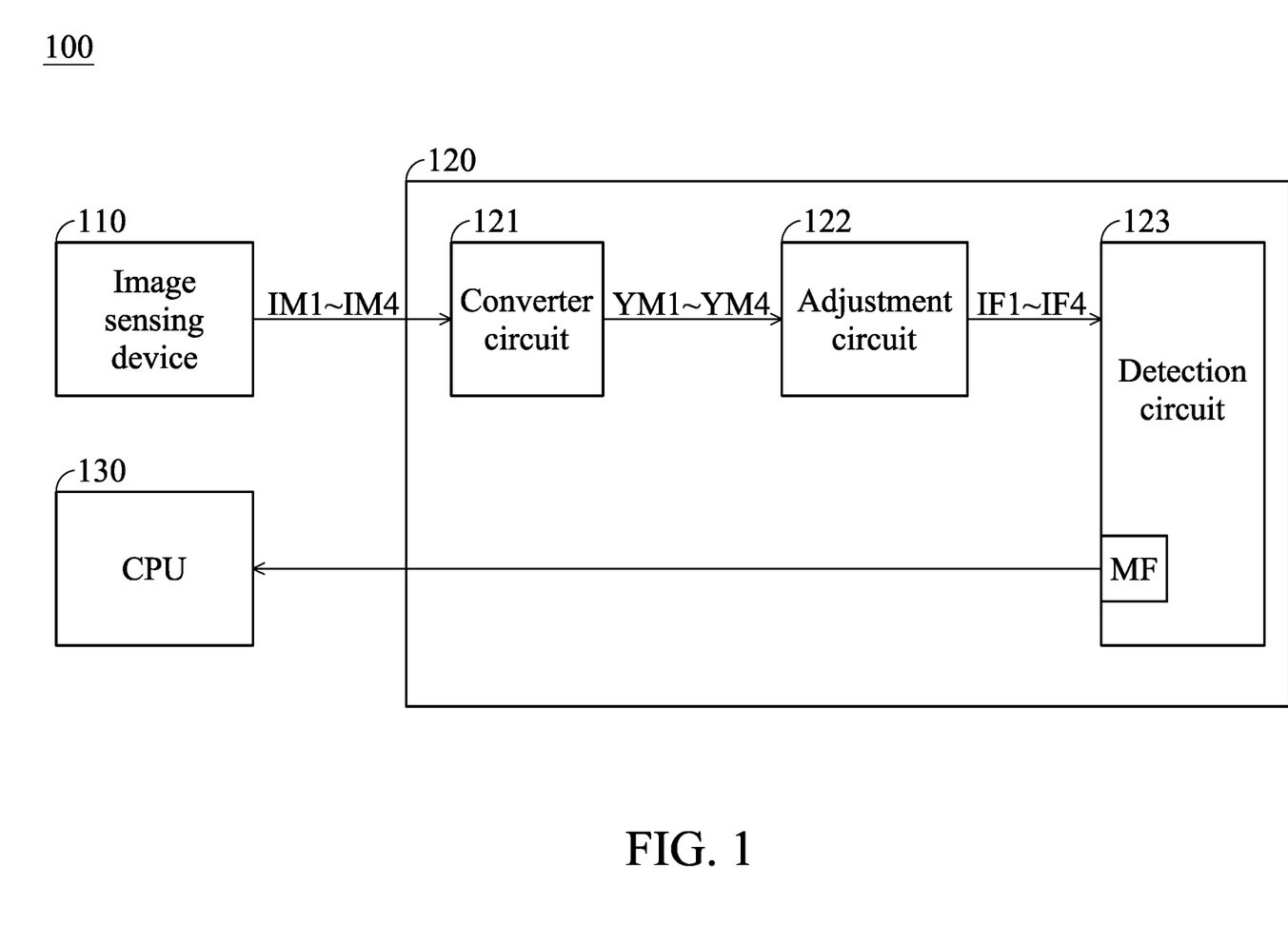
FIG. 1 is a schematic diagram of an exemplary embodiment of an operating system according to various aspects of the present disclosure.

FIG. 1 is a schematic diagram of an exemplary embodiment of an operating system according to various aspects of the present disclosure. The operating system 100 comprises an image sensing device 110, a control chip 120, and a central processing unit (CPU) 130. The image sensing device 110 captures an external scene to generate images IM1~IM4. In some embodiments, the images IM1~IM4 conform a RGB image format. In this embodiment, the images IM1~IM4 are continuous images. The number of images is not limited in the present disclosure. In other embodiments, the image sensing device 110 generates more images. The kind of image sensing device 110 is not limited in the present disclosure. In one embodiment, the image sensing device 110 is a camera module. In other embodiments, the image sensing device 110 comprises a charge-coupled device (CCD) image sensor or a complementary metal oxide semiconductor (CMOS) image sensor.

The control chip 120 is coupled to the image sensing device 110 and the CPU 130. When the CPU 130 enters a low-power mode (e.g., a standby mode), the control chip 120 determines whether a change occurs in the external scene according to the images IM1~IM4. For example, a moving object enters the external scene. When a change occurs in the external scene, the control chip 120 wakes up the CPU 130. Therefore, the CPU 130 exits the low-power mode and enters a normal mode. In one embodiment, when the CPU operates in the normal mode, the control chip 120 stops operating. For example, it will stop determining whether a moving object appears in the external scene. The kind of control chip 120 is not limited in the present disclosure. In some embodiments, the control chip 120 is a micro-controller unit (MCU). In one embodiment, the CPU 130 is integrated in the control chip 120.

In some embodiments, when the CPU 130 enters the low-power mode, the power consumption of the operating system 100 can be reduced. At this time, the control chip 120 determines whether a moving object appears in the external scene according to the images IM1~IM4. When a moving object appears in the external scene, the control chip 120 immediately wakes up the CPU 130. Therefore, even if the operating system 100 operates in a power-down mode, the operating system 100 is capable of detecting the changes in the external scene. After the CPU 130 enters the normal mode, the control chip 120 stops determining whether a moving object appears in the external scene. Therefore, the power consumption of the operating system 100 can be reduced.

In this embodiment, the control chip 120 comprises a converter circuit 121, an adjustment circuit 122 and a detection circuit 123. The converter circuit 121 converts images IM1~IM4 to generate gray-level images YM1~YM4. In one embodiment, the converter circuit 121 converts the images IM1~IM4 from an RGB image format into a YCbCr format, wherein Y represents luminance, Cb and Cr represent chrominance. In this embodiment, the converter circuit 121 uses the brightness component of the images IM1~IM4 as the gray-level images YM1~YM4. In this case, the amount of data in the gray-level images YM1~YM4 is less than the amount of data in the images IM1~IM4.

In some embodiments, the resolution of gray-level images YM1~YM4 is the same as the resolution of images IM1~IM4. For example, each of the images IM1~IM4 and the gray-level images YM1~YM4 has the amount of data in 640*480 pixels. The structure of converter circuit 121 is not limited in the present disclosure. Any circuit can serve as the converter circuit 121, as long as the circuit is capable of retrieving brightness component of an RGB image.

The adjustment circuit 122 scales down the resolution of gray-level images YM1~YM4 to generate image frames IF1~IF4. In one embodiment, each of the gray-level images YM1~YM4 has the amount of data in 640*480 pixels, and each of the image frames IF1~IF4 has the amount of data in 320*240 pixels. The structure of adjustment circuit 122 is not limited in the present disclosure. In one embodiment, the adjustment circuit 122 samples the gray-level images YM1~YM4 and uses the sampled results as the image frames IF1~IF4. In other embodiments, any circuit can serve as the adjustment circuit 122, as long as the circuit is capable scaling down the size of an image. In some embodiments, at least one of the converter circuit 121 and the adjustment circuit 122 is disposed external to the control chip 120.

The detection circuit 123 determines whether a change occurs in an external scene according to the image frames IF1~IF4. For example, a moving object enters the external scene. When a change occurs in the external scene, the detection circuit 123 wakes up the CPU 130. The disclosure does not limit how the detection circuit 123 wakes up the CPU 130. In one embodiment, the detection circuit 123 enables a flag MF. For example, detection circuit 123 sets the value of the flag MF to a specific value. When the value of flag MF is changed from a predetermined value (e.g., 0) to a specific value (e.g., 1), the CPU 130 enters a normal mode from a low-power mode. In the normal mode, the CPU 130 operates normally. At this time, the detection circuit 123 may stop operating.

Figure 2:
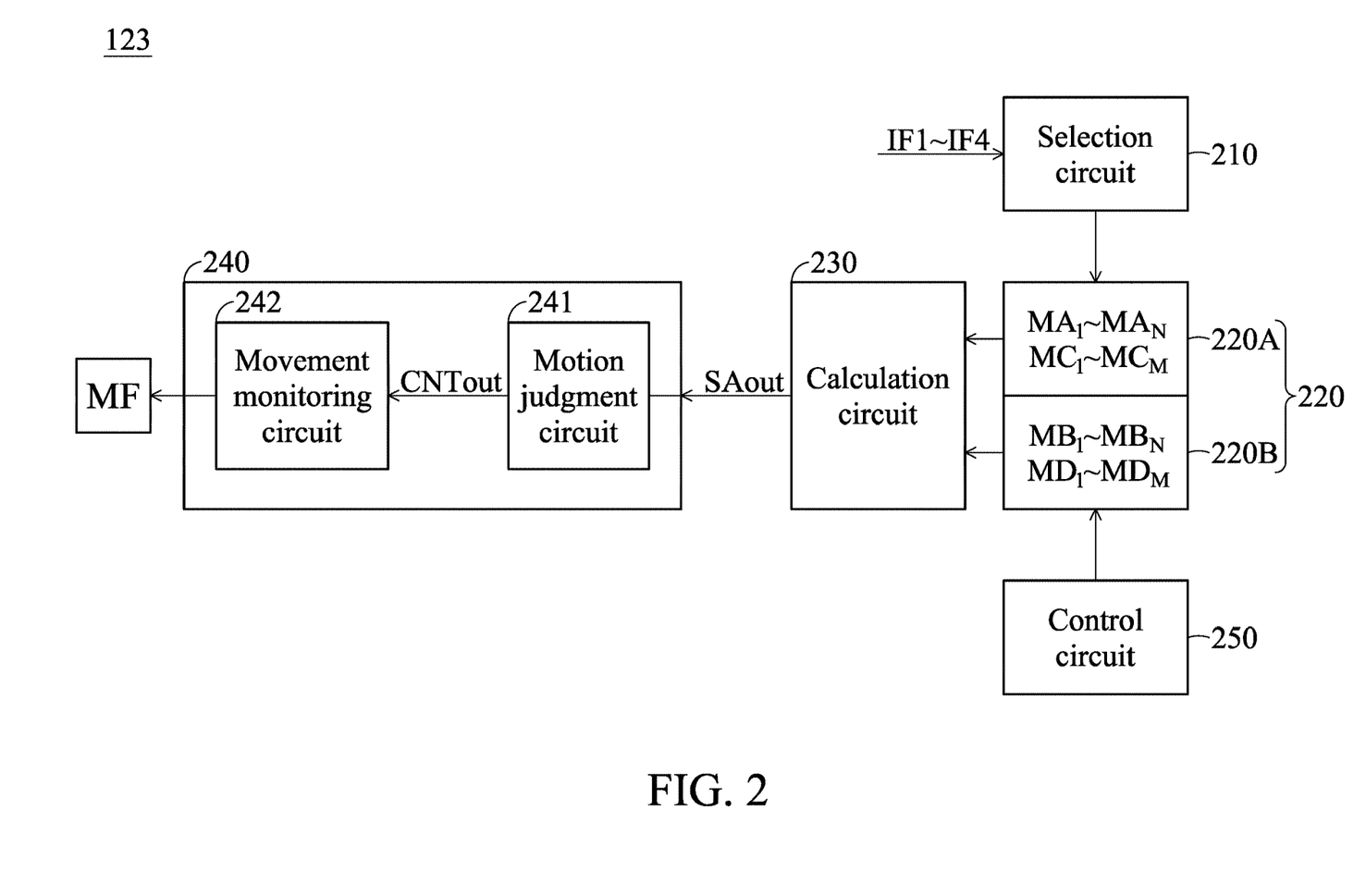
FIG. 2 is a schematic diagram of an exemplary embodiment of a detection circuit according to various aspects of the present disclosure.

FIG. 2 is a schematic diagram of an exemplary embodiment of the detection circuit according to various aspects of the present disclosure. The detection circuit 123 comprises a selection circuit 210, a buffer circuit 220, a calculation circuit 230, and a motion judgment circuit 240. The selection circuit 210 receives the image frames IF1~IF4 and selects some of image macro-blocks of each of the image frames IF1~IF4. In one embodiment, each of the image frames IF1~IF4 comprises a plurality of image macro-blocks. The image macro-blocks of the image frame IF1 may be referred to as first image macro-blocks. The selected image macro-blocks of the image frame IF1 may be referred to as first specific image macro-blocks. The number of first specific macro-blocks is less than the number of first image macro-blocks. The image macro-blocks of the image frame IF2 may be referred to as second image macro-blocks. The selected image macro-blocks of the image frame IF2 may be referred to as second specific image macro-blocks. The number of second specific macro-blocks is less than the number of second image macro-blocks. The image macro-blocks of the image frame IF3 may be referred to as third image macro-blocks. The selected image macro-blocks of the image frame IF3 may be referred to as third specific image macro-blocks. The number of third specific macro-blocks is less than the number of third image macro-blocks. The image macro-blocks of the image frame IF4 may be referred to as fourth image macro-blocks. The selected image macro-blocks of the image frame IF4 may be referred to as fourth specific image macro-blocks. The number of fourth specific macro-blocks is less than the number of fourth image macro-blocks. The selection circuit 210 stores the selected image macro-blocks of each of the image frames IF1~IF4 in the buffer circuit 220. In one embodiment, odd image frames (e.g., IF1 and IF3) are referred as present frames or previous images, and even image frames (e.g., IF2 and IF4) are referred as next frames or current frames.

The buffer circuit 220 comprises an input port to receive the output from the selection circuit 210. The buffer circuit 220 comprises two output ports to output the image macro-blocks of two image frames simultaneously. In this embodiment, the buffer circuit 220 comprises scratch memories 220A and 220B.

The scratch memory 220A is configured to store the portion of image macro-blocks of present image frames. For example, the scratch memory 220A stores the gray-levels of the image macro-blocks $MA_1$~$MA_N$ of the image frame IF1 and the gray-levels of the image macro-blocks $MC_1$~$MC_M$ of the image frame IF3. In some embodiments, the number of image macro-blocks $MA_1$~$MA_N$ may be the same or different from the number of image macro-blocks $MC_1$~$MC_M$.

The scratch memory 220B is configured to store the portion of image macro-blocks of current image frames. For example, the scratch memory 220B stores the gray-levels of the image macro-blocks $MB_1$~$MB_N$ of the image frame IF2 and the gray-levels of the image macro-blocks $MD_1$~$MD_M$ of the image frame IF4. In some embodiments, the number of image macro-blocks $MB_1$~$MB_N$ may be the same or different from the number of image macro-blocks $MD_1$~$MD_M$.

In other embodiments, the number of image macro-blocks $MA_1$~$MA_N$ is the same as the number of image macro-blocks $MB_1$~$MB_N$. In this case, the number of image macro-blocks $MC_1$~$MC_M$ is the same as the number of image macro-blocks $MD_1$~$MD_M$. In some embodiments, the storage space of scratch memory 220A is the same as the storage space of scratch memory 220B.

In other embodiments, the detection circuit 123 further comprises a control circuit 250. The control circuit 250 monitors the scratch memories 220A and 220B. The control circuit 250 directs the scratch memories 220A and 220B to sequentially output data when the scratch memories 220A and 220B store enough data, for example the image macro-blocks $MA_1$~$MA_N$ have been stored in the scratch memory 220A and the image macro-blocks $MB_1$~$MB_M$ have been stored in the scratch memory 220B.

In one embodiment, the scratch memory 220A uses a first-in first-out (FIFO) method to output the image macro-blocks $MA_1$~$MA_N$ and the scratch memory 220A also uses the FIFO method to output the image macro-blocks $MB_1$~$MB_M$. For example, when the scratch memory 220A outputs the image macro-block $MA_1$, the scratch memory 220B outputs the image macro-block $MB_1$. When the scratch memory 220A outputs the image macro-block $MA_2$, the scratch memory 220B outputs the image macro-block $MB_2$. In this case, the position of image macro-block $MA_1$ in the image frame IF1 is the same as the position of image macro-block $MB_1$ in the image frame IF2, and the position of image macro-block $MA_2$ in the image frame IF1 is the same as the position of image macro-block $MB_2$ in the image frame IF2. However, the position of image macro-block $MA_1$ in the image frame IF1 is different from the position of image macro-block $MA_2$ in the image frame IF1.

The calculation circuit 230 accesses the scratch memories 220A and 220B and calculates the difference between the image macro-blocks stored in the scratch memories 220A and 220B to generate a calculation result SAout. In this case, the calculation result SAout comprises a plurality of differences, and each difference represents the difference between one image macro-block stored in the scratch memory 220A and a corresponding image macro-block stored in the scratch memory 220B.

Taking image frames IF1 and IF2 as an example, since the position of the image macro-block $MA_1$ in the image frame IF1 is the same as the position of the image macro-block $MB_1$ in the image frame IF2, the calculation circuit 230 calculates the difference between the gray-level of the image macro-block $MA_1$ and the gray-level of the image macro-block $MB_1$. Similarly, the position of the image macro-block $MA_N$ in the image frame IF1 is the same as the position of the image macro-block $MB_N$ in the image frame IF2, the calculation circuit 230 calculates the difference between the gray-level of the image macro-block $MA_N$ and the gray-level of the image macro-block $MB_N$.

The present disclosure does not limit how the calculation circuit 230 calculates the data of image macro-blocks stored in the scratch memories 220A and 220B. In one embodiment, the calculation circuit 230 performs a sum of absolute different (SAD) operation for each image macro-blocks stored in the scratch memory 220A and the corresponding image macro-blocks stored in the scratch memory 220B to generate the calculation result SAout.

The motion judgment circuit 240 determines whether there has been a change between two image frames according to the calculation result SAout. Taking image frames IF1 and IF2 as an example, when there has been a change between image frames IF1 and IF2, the motion judgment circuit 240 enables the flag MF. In one embodiment, the motion judgment circuit 240 records the number of differences which are contained in the calculation result SAout and are higher than a first threshold value. In this case, when a difference of the calculation result SAout exceeds a first threshold value, the motion judgment circuit 240 increases a count value CNTout. Next, the motion judgment circuit 240 may determines whether the count value CNTout exceeds a second threshold value every a fixed time interval. When the count value CNTout exceeds a second threshold value, this indicates that there has been a change between image frames IF1 and IF2. Therefore, motion judgment circuit 240 enables the flag MF. However, when the count value CNTout does not exceed a second threshold value, this indicates that there has been no change between image frames IF1 and IF2. Therefore, the motion judgment circuit 240 does not enable the flag MF.

The structure of motion judgment circuit 240 is not limited in the present disclosure. In this embodiment, the motion judgment circuit 240 comprises a motion judgment circuit 241 and a movement monitoring circuit 242. The motion judgment circuit 241 receives the calculation result SAout and adjusts the count value CNTout according to the calculation result SAout. For example, when a difference contained in the calculation result SAout is greater than a first threshold value, the motion judgment circuit 241 increases the count value CNTout. When a difference contained in the calculation result SAout is not greater than a first threshold value, the motion judgment circuit 241 does not increase the count value CNTout. The structure of motion judgment circuit 241 is not limited in the present disclosure. In one embodiment, the motion judgment circuit 241 comprises a comparator and a counter. The comparator is configured to compare the differences included in the calculation result SAout and a first threshold value. The counter adjusts the count value CNTout according to the results of this comparison.

The movement monitoring circuit 242 determines whether the count value CNTout is greater than a second threshold value. In one embodiment, the movement monitoring circuit 242 comprises a comparator (not shown) to compare the count value CNTout and a second threshold value. When the count value CNTout is greater than a second threshold value, this indicates that there has been a change between image frames IF1 and IF2. Therefore, the movement monitoring circuit 242 enables the flag MF. However, when the count value CNTout is not greater than a second threshold value, this indicates that there has been no change between image frames IF1 and IF2. Therefore, the movement monitoring circuit 242 does not enable the flag MF.

Figure 3A:
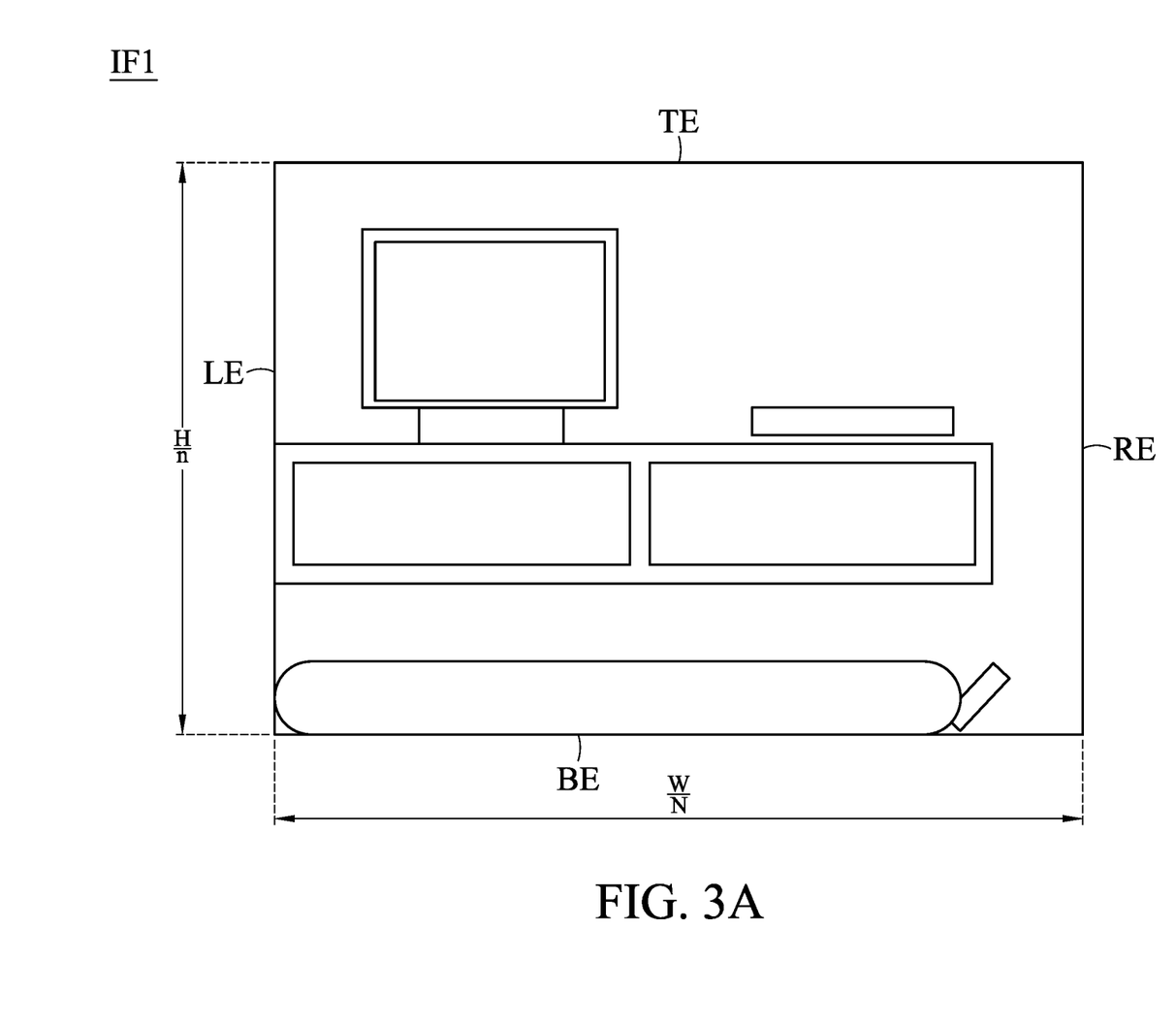
FIG. 3A is a schematic diagram of an exemplary embodiment of an image frame according to various aspects of the present disclosure.

FIG. 3A is a schematic diagram of an exemplary embodiment of an image frame according to various aspects of the present disclosure. Since the characteristics of the image frames IF1~IF4 are the same, the image frame IF1 is shown in FIG. 3A. In one embodiment, the image frame IF1 has (W/n)*(H/n) pixels, H represents the number (e.g., 640) of pixels of a column (vertical direction) in the image IM1, W represents the number (e.g., 320) of pixels of a row (horizontal direction) in the image IM1, n represents the scaling parameter (e.g., 2) of the adjustment circuit 122.

Additionally, the image frame IF1 comprises a left-edge LE, a right-edge RE, a top-edge TE, and a bottom-edge BE. The left-edge LE is parallel to the right-edge RE and is vertical to the top-edge TE and the bottom-edge BE. The top-edge TE is parallel to the bottom-edge BE and is vertical to the left-edge LE and the right-edge RE.

Figure 3B:
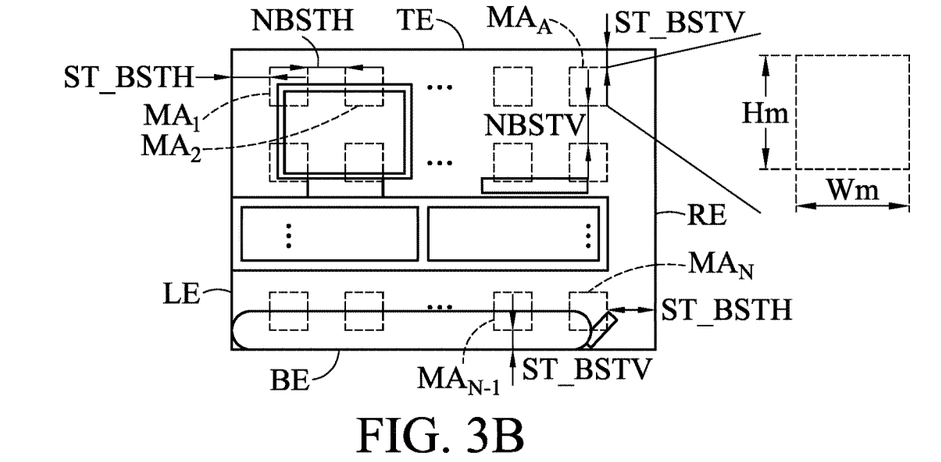
FIG. 3B is a schematic diagram of an exemplary embodiment of an image macro-blocks according to various aspects of the present disclosure.

FIG. 3B is a schematic diagram of an exemplary embodiment of an image macro-blocks according to various aspects of the present disclosure. Since the characteristics of the image macro-blocks $MA_1 \sim MA_N$, $MB_1 \sim MB_N$, $MC_1 \sim MC_M$, and $MD_1 \sim MD_M$ are the same, the image macro-blocks $MA_1 \sim MA_N$ are given as an example and shown in FIG. 3B. In this embodiment, the selection circuit 210 retrieves the image macro-blocks $MA_1 \sim MA_N$ of the image frame IF1. In some embodiments, when the selection circuit 210 retrieves N image macro-blocks of a first frame referred to as a previous frame (e.g., the image frame IF1), the selection circuit 210 also retrieves N image macro-blocks of a second frame referred to as a current frame (e.g., the image frame IF2) subsequent to the first frame. In this case, the selection circuit 210 may retrieve M image macro-blocks of a third frame (e.g., the image frame IF3) subsequent to the second frame, and retrieve M image macro-blocks of a fourth frame (e.g., the image frame IF4) subsequent to the third frame. M may not be equal to N.

In this embodiment, each of the image macro-blocks $MA_1 \sim MA_N$ has Wm*Hm pixels. For example, each of the image macro-blocks $MA_1 \sim MA_N$ may comprise 16*16 pixels (or 8*8 pixels). In some embodiments, each pixel comprises three sub-pixels. The size and shape of each of the image macro-blocks $MA_1 \sim MA_N$ are not limited in the present disclosure. In one embodiment, the image macro-blocks $MA_1 \sim MA_N$ has a rectangle shape.

In this embodiment, the image macro-blocks $MA_1 \sim MA_N$ are arranged into an array. In this case, the distance between each image macro-block of each column and each image macro-block of an adjacent column is the length NBSTH. The distance between each image macro-block (e.g., $MA_1$) of leftmost column and the left-edge LE of the image frame IF1 is the length ST_BSTH. The distance between each image macro-block (e.g., $MA_N$) of rightmost column and the right-edge RE of the image frame IF1 is the length ST_BSTH. In another embodiment, the distance between each image macro-block of leftmost column and the left-edge LE of the image frame IF1 may be greater than or less than the distance between each image macro-block of rightmost column and the right-edge RE of the image frame IF1.

Furthermore, the distance between each image macro-block of each row and each image macro-block of an adjacent row is the length NBSTV. The distance between each image macro-block (e.g., $MA_A$) of topmost row and the top-edge TE of the image frame IF1 is the length ST_BSTV. The distance between each image macro-block (e.g., $MA_{N-1}$) of bottommost row and the bottom-edge BE of the image frame IF1 is the length ST_BSTV. In another embodiment, the distance between each image macro-block of topmost row and the top-edge TE of the image frame IF1 may be greater than or less than the distance between each image macro-block of bottommost row and the bottom-edge BE of the image frame IF1.

Figure 3C:
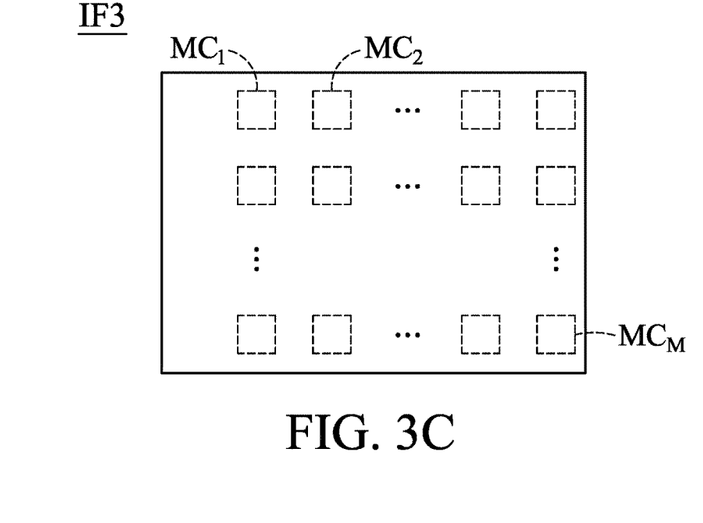
FIG. 3C is a schematic diagram of another exemplary embodiment of the image macro-blocks according to various aspects of the present disclosure.

FIG. 3C is a schematic diagram of another exemplary embodiment of the image macro-blocks according to various aspects of the present disclosure. To avoid blind blocks not being detected, the selection circuit 210 retrieves the image macro-blocks $MC_1 \sim MC_M$ of the third frame (e.g., the image frame IF3). In this case, the positions of the image macro-blocks $MC_1 \sim MC_M$ of the image frame IF3 are different from the positions of the image macro-blocks $MA_1 \sim MA_N$ of the image frame IF1 of FIG. 3B. For example, the pixels in the image macro-block $MC_1$ are the pixels between the image macro-blocks $MA_1$ and $MA_2$ of FIG. 3B.

Figure 4A:
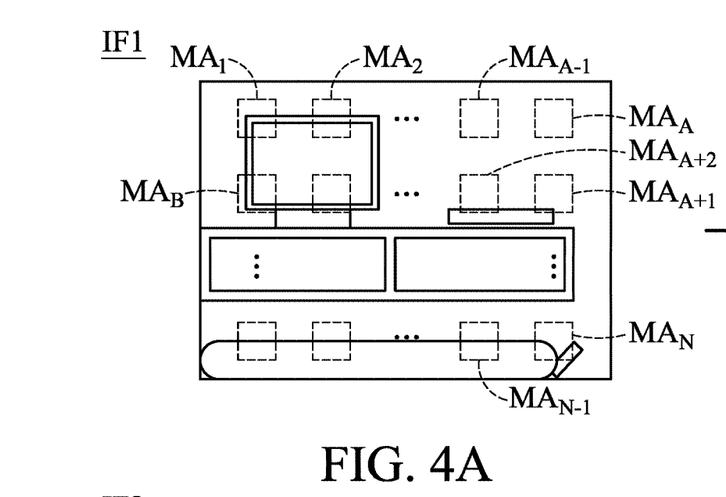
FIG. 4A is a schematic diagram of an exemplary embodiment of an image frame according to various aspects of the present disclosure.
Figure 4B:
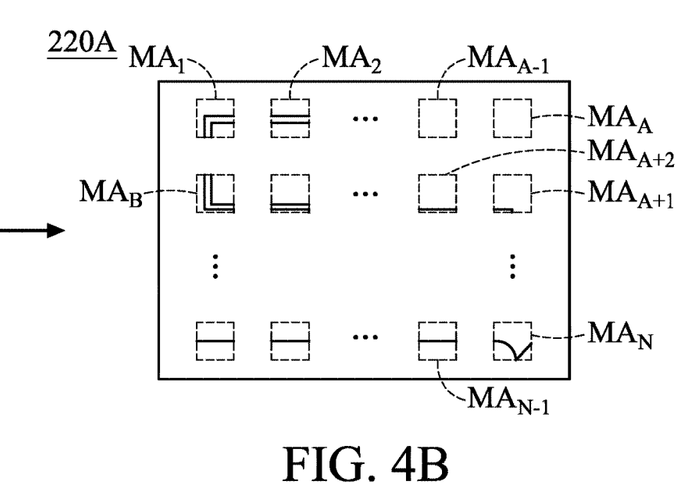
FIG. 4B is a schematic diagram of an exemplary embodiment of an scratch memory storing the image macro-blocks according to various aspects of the present disclosure.

FIG. 4A is a schematic diagram of an exemplary embodiment of the image frame IF1 according to various aspects of the present disclosure. FIG. 4B is a schematic diagram of an exemplary embodiment of the image macro-blocks stored in the scratch memory 220A according to various aspects of the present disclosure. In this embodiment, the selection circuit 210 selects the image macro-blocks $MA_1 \sim MA_N$ of the image frame IF1. Therefore, the scratch memory 220A stores the data of the image macro-blocks $MA_1 \sim MA_N$, such as the gray-level of each pixel in the image macro-blocks $MA_1 \sim MA_N$.

Figure 5A:
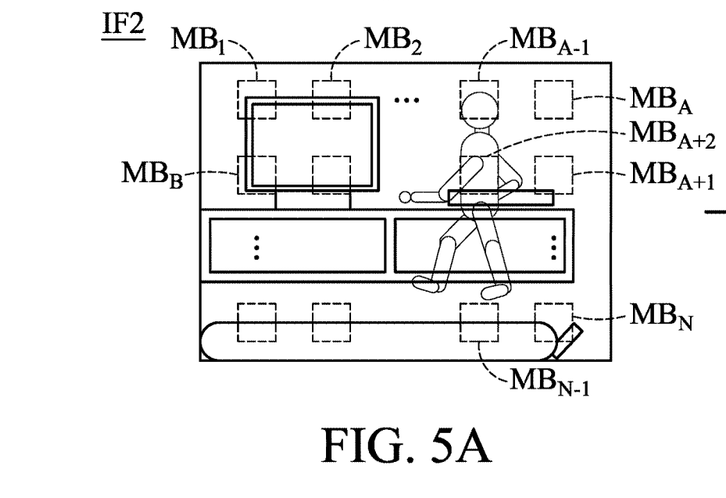
FIG. 5A is a schematic diagram of another exemplary embodiment of the image frame according to various aspects of the present disclosure.
Figure 5B:
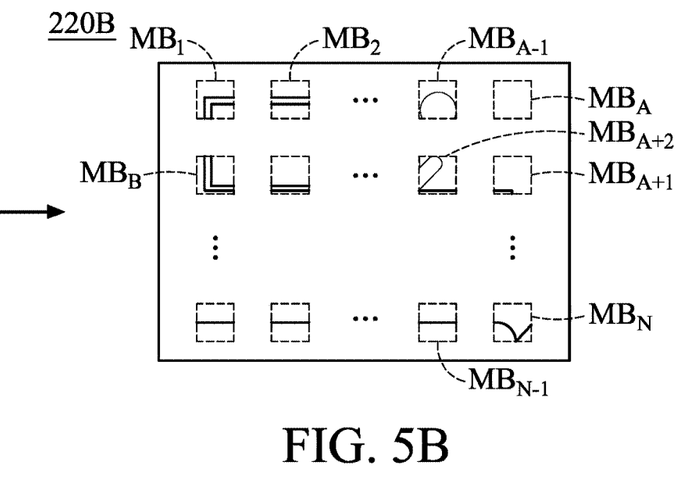
FIG. 5B is a schematic diagram of another exemplary embodiment of the scratch memory storing the image macro-blocks according to various aspects of the present disclosure.

FIG. 5A is a schematic diagram of another exemplary embodiment of the image frame IF2 according to various aspects of the present disclosure. FIG. 5B is a schematic diagram of another exemplary embodiment of the image macro-blocks stored in the scratch memory 220B according to various aspects of the present disclosure. In this embodiment, the selection circuit 210 selects the image macro-blocks $MB_1 \sim MB_N$ of the image frame IF2. Therefore, the scratch memory 220B stores the data of the image macro-blocks $MB_1 \sim MB_N$, such as the gray-level of each pixel in the image macro-blocks $MB_1 \sim MB_N$.

Since an user appears in the image frame IF2, the data of the image macro-blocks $MB_{A-1}$ and $MB_{A+2}$ of the image frame IF2 are different from the data of the image macro-blocks $MA_{A-1}$ and $MA_{A+2}$ of the image frame IF1. In other embodiments, if there is no user in the image frame IF2, the data of the image macro-blocks $MB_1 \sim MB_N$ stored in the scratch memory 220B are the same as the data of the image macro-blocks $MA_1 \sim MA_N$ stored in the scratch memory 220A.

Figure 6:
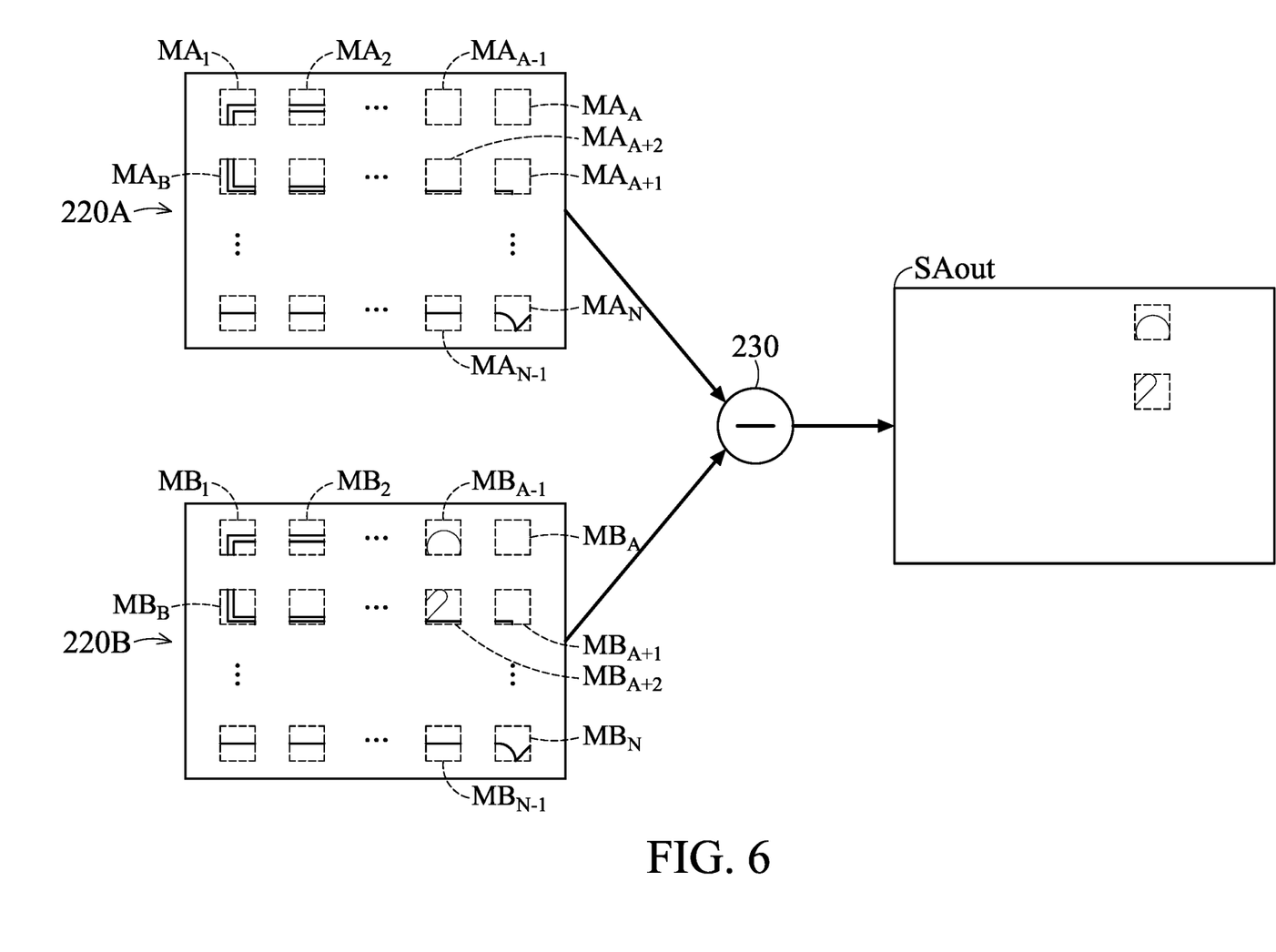
FIG. 6 is a schematic diagram of an exemplary embodiment of a calculation circuit according to various aspects of the present disclosure.

FIG. 6 is a schematic diagram of an exemplary embodiment of a calculation circuit according to various aspects of the present disclosure. The calculation circuit 230 calculates the differences between the image macro-blocks stored in the scratch memory 220A and the image macro-blocks stored in the scratch memory 220B to generate a calculation result SAout. For example, since the data of the image macro-block $MA_1$ is the same as the data of the image macro-block $MB_1$, the difference between the image macro-blocks $MA_1$ and $MB_1$ is less than a first threshold value. Similarly, the data of all pixels in the image macro-block $MA_2$ is the same as that of the image macro-block $MB_2$, and the difference between the image macro-blocks $MA_1$ and $MB_1$ is also less than the first threshold value.

However, the data of the image macro-block $MA_{A-1}$ is not the same as that of the image macro-block $MB_{A-1}$, and the difference between the image macro-blocks $MA_{A-1}$ and $MB_{A-1}$ is not less than the first threshold value. Similarly, the data of the image macro-block $MA_{A+2}$ is not the same as that of the image macro-block $MB_{A+2}$, and the difference between the image macro-blocks $MA_{A+2}$ and $MB_{A+2}$ is also not less than the first threshold value.

The present disclosure does not limit the sequence in which the scratch memory 220A outputs the image macro-blocks $MA_1 \sim MA_N$ and the sequence in which the scratch memory 220B outputs the image macro-blocks $MB_1$~$MB_N$. The sequence in which the scratch memory 220A outputs the image macro-blocks $MA_1$~$MA_N$ is the same as the sequence in which the scratch memory 220B outputs the image macro-blocks $MB_1$~$MB_N$. Taking the scratch memory 220A as an example, the scratch memory 220A outputs the data of the image macro-block $MA_1$ which is the leftmost image macro-block of the first row, and then outputs the data of the image macro-blocks $MA_2$~$MA_A$ disposed in the first row sequentially from left to right. Next, the scratch memory 220A outputs the data of the image macro-block $MA_{A+1}$ which is the rightmost image macro-block of the second row, and then outputs the data of the image macro-blocks $MA_{A+2}$~$MA_B$ disposed in the second row sequentially from right to left. Next, the scratch memory 220A outputs the data of the image macro-block which is the leftmost image macro-block of the third row (not shown), and then outputs the data of the image macro-blocks disposed in the third row sequentially from left to right. Since the scratch memory 220A is not required to store the gray-levels of all pixels of the image frame IF1, there is no need to use memory with large storage space.

In other embodiments, the selection circuit 210 selects the image macro-blocks $MC_1$~$MC_M$ (referred to as third image macro-blocks) among all image macro-blocks of the image frame IF3 (referred to as the previous frame) and the image macro-blocks $MD_1$~$MD_M$ (referred to as fourth image macro-blocks) among all image macro-blocks of the image frame IF4 (referred to as the current frame). In this case, the scratch memory 220A stores the image macro-blocks $MC_1$~$MC_M$, and the scratch memory 220B stores the image macro-blocks $MD_1$~$MD_M$. The calculation circuit 230 calculates the differences between the image macro-blocks $MC_1$~$MC_M$ and $MD_1$~$MD_M$ to generate the calculation result SAout. In this case, the calculation result SAout comprises a plurality of differences (referred to as second differences). The number of second differences is the same as the number of image macro-blocks $MC_1$~$MC_M$. The motion judgment circuit 240 determines whether there has been a change between the image frames IF3 and IF4 according to the calculation result SAout which has a plurality of second differences. When there has been a change between the image frames IF3 and IF4, the motion judgment circuit 240 enables the flag MF.

In one embodiment, the positions of the image macro-blocks $MC_1$~$MC_M$ in the image frame IF3 are the same as the positions of the image macro-blocks $MD_1$~$MD_M$ in the image frame IF4. In this case, the positions of the image macro-blocks $MC_1$~$MC_M$ in the image frame IF3 are different from the positions of the image macro-blocks $MA_1$~$MA_N$ in the image frame IF1.

Figure 7:
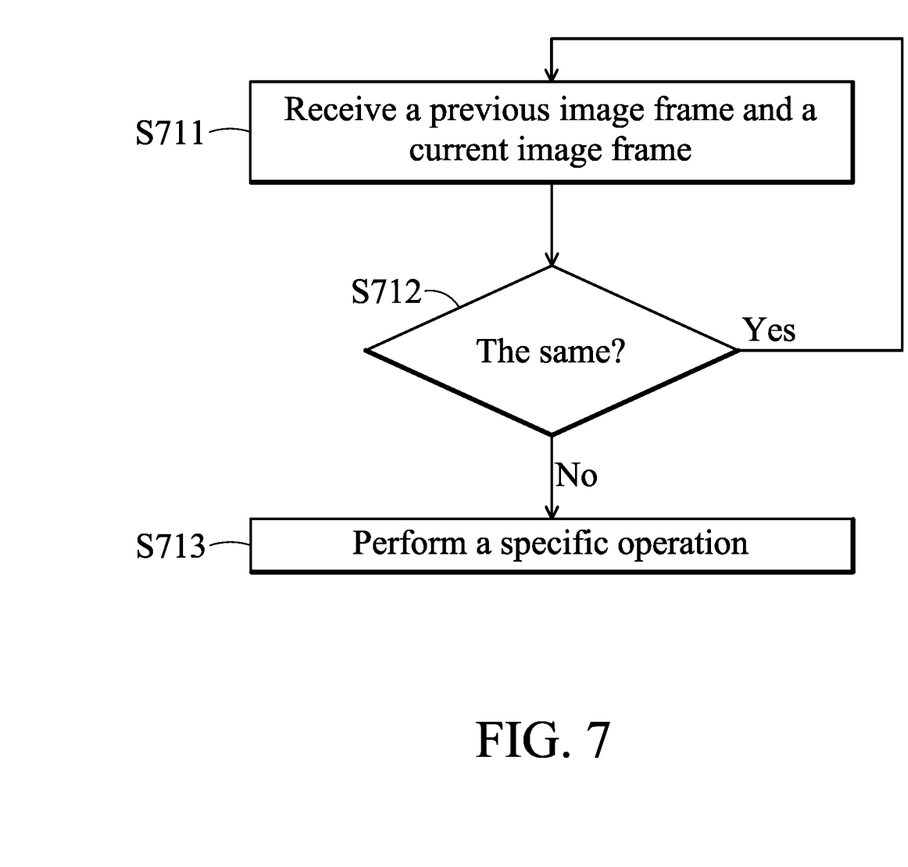
FIG. 7 is a flowchart of an exemplary embodiment of a dynamic image judgment method according to various aspects of the present disclosure.

FIG. 7 is a flowchart of an exemplary embodiment of a dynamic image judgment method according to various aspects of the present disclosure. The dynamic image judgment method may take the form of a program code. When the program code is loaded into and executed by a machine, the machine thereby becomes the control chip for practicing the methods. In one embodiment, when a CPU operates in a low-power mode, a micro-controller starts to determine whether there is a dynamic image.

First, a first image frame and a second image frame are received (step S711). The first image frame comprises a plurality of first image macro-blocks. The second image frame comprises a plurality of second image macro-blocks. In this embodiment, the resolution of the first image frame is equal to the resolution of the second image frame. In one embodiment, the first image frame is related to a first image, and the second image frame is related to a second image. In this case, an image sensing device captures an external scene to generate first image and a second image. The first image and the second image are continuous images and conform a RGB image format. The first image and second image are converted by a converter circuit to generate a first gray-level image and a second gray-level image. In some embodiments, the converter circuit converts the first and second images from the RGB image format to a YCbCr format. In this case, the converter circuit uses the gray-level component of the first image as the first gray-level image, and it uses the gray-level component of the second image as the second gray-level image. An adjustment circuit adjusts the amount of data in the first gray-level image and adjusts the amount of data in the second gray-level image. In one embodiment, the adjustment circuit reduces the resolution of the first gray-level image to generate a first image frame and reduces the resolution of the second gray-level image to generate a second image frame. For example, the first gray-level image has 640*480 pixels, and the first image frame has 320*240 pixels.

Next, some of image macro-blocks of the first image frame and some of image macro-blocks of the second image frame are compared to determine whether the second image frame is the same as the first image frame (step S712). Since step S712 is not to compare all image macro-blocks of the first image frame and all image macro-blocks of the second image frame, the comparison time of step S712 is reduced.

In one embodiment, some image macro-blocks of the first image frame and some of image macro-blocks of the second image frame are selected in step S712. The selected image macro-blocks of the first image frame are referred to as first specific image macro-blocks, and the selected image macro-blocks of the second image frame are referred to as second specific image macro-blocks. The number of first specific image macro-blocks is the same as the number of second specific image macro-blocks. Additionally, the positions of the first specific image macro-blocks in the first image frame are the same as the positions of the second specific image macro-blocks in the second image frame.

A SAD operation is performed on the gray-levels of the first specific image macro-blocks and the second specific image macro-blocks to generate a plurality of calculation results (referred to as a plurality of first differences) in step S712. In this embodiment, the image macro-blocks calculated in step S712 have the same position. For example, assume that a first specific block among the selected first image macro-blocks and a second specific block among the selected second image macro-blocks are calculated in step S712. In this case, the position of the first specific block in the first image frame is the same as the position of the second specific block in the second image frame.

Then, step S712 is performed to determine whether the second image frame is the same as the first image frame according to the calculation results. In one embodiment, step S712 is performed to determine whether each of the calculation results exceeds a first threshold value and adjust a count value according to the determination results. For example, when one calculation result exceeds a first threshold value, a count value is increased in step S712. When one calculation result does not exceed the first threshold value, step S712 is performed to stop increasing the count value. When the count value does not exceed a second threshold value, this indicates that the second image frame is the same as the first image frame.

However, when the count value exceeds the second threshold value, this indicates that the second image frame is different from the first image frame. Therefore, a specific operation is performed (step S713). In one embodiment, the specific operation is performed to wake up a CPU. In another embodiment, step S713 is performed to enable a flag to wake a CPU up. When the CPU is woken up, the CPU exits the low-power mode and enters a normal mode. In the normal mode, the CPU has power consumption more than power consumption in the low-power mode.

When the second image frame is the same as the first image frame, step S711 is performed to receive a third image frame (referred to as a previous frame) succeeding the second image frame and to receive a fourth image frame (referred to as a current frame) succeeding the third image frame. In this case, some of image macro-blocks of the third image frame and some of image macro-blocks of the fourth image frame are selected in step S712. The selected image macro-blocks of the third image frame are referred to as third specific image macro-blocks, and the selected image macro-blocks of the fourth image frame are referred to as fourth specific image macro-blocks. In this case, the differences between the third specific image macro-blocks and the fourth specific image macro-blocks are calculated to generate a plurality of calculation results (referred to as a plurality of second differences) in step S712. A determination is made as to whether the fourth image frame is the same as the third image frame according to the second differences in step S712. When the fourth image frame is different from the third image frame, the CPU is woken up (step S713). When the fourth image frame is the same as the third image frame, two succeeding image frames are received and compared.

In some embodiments, the positions of the third specific image macro-blocks selected by step S712 in the third image frame are the same as the positions of the selected fourth image macro-blocks in the fourth image frame. In this case, the positions of the selected third image macro-blocks in the third image frame are different from the positions of the selected first image macro-blocks in the first image frame.

Judgment methods, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine such as a computer, the machine thereby becomes a control chip and an operating system for practicing the methods. The methods may also be embodied in the form of a program code transmitted over some transmission medium, such as electrical wiring or cabling, through fiber optics, or via any other form of transmission, wherein, when the program code is received and loaded into and executed by a machine such as a computer, the machine becomes a control chip and an operating system for practicing the disclosed methods. When implemented on a general-purpose processor, the program code combines with the processor to provide a unique apparatus that operates analogously to application-specific logic circuits.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein. It will be understood that although the terms "first," "second," etc. may be used herein to describe various elements, these elements should not be limited by these terms. These terms are only used to distinguish one element from another.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A control chip coupled to a central processing unit (CPU), comprising:
    a selection circuit receiving a first image frame and a second image frame, wherein the first image frame comprises a plurality of first image macro-blocks, the second image frame comprises a plurality of second image macro-blocks, the selection circuit selects a plurality of first specific macro-blocks of the first image macro-blocks and a plurality of second specific macro-blocks of the second image macro-blocks, the number of first specific macro-blocks is less than the number of first image macro-blocks, and the number of second specific macro-blocks is less than the number of second image macro-blocks;
    a buffer circuit storing the first specific image macro-blocks and the second specific image macro-blocks;
    a calculation circuit accessing the buffer circuit and calculating differences between the first specific image macro-blocks and the second specific image macro-blocks to generate a first calculated result; and
    a motion judgment circuit determining whether the second image frame is the same as the first image frame according to the first calculated result,
    wherein in response to the second image frame not being the same as the first image frame, the motion judgment circuit wakes up the CPU so that the CPU enters a normal mode from a low-power mode.

2. The control chip as claimed in claim 1, wherein:
    in response to the CPU entering the normal mode, the motion judgment circuit stops operating, and
    in response to the CPU entering the low-power mode, the motion judgment circuit starts to operate.

3. The control chip as claimed in claim 1, wherein:
    in response to the second image frame not being the same as the first image frame, the motion judgment circuit enables a flag, and
    in response to the flag being enabled, the CPU enters the normal mode from the low-power mode.

4. The control chip as claimed in claim 1, further comprising:
    a converter circuit converting a first image to generate a first gray-level image and converting a second image to generate a second gray-level image; and
    an adjustment circuit reducing the amount of data in the first gray-level image to generate the first image frame and reducing the amount of data in the second gray-level image to generate the second image frame.

5. The control chip as claimed in claim 1, wherein the position of one of the first specific image macro-blocks in the first image frame is the same as the position of one of the second specific image macro-blocks in the second image frame.

6. The control chip as claimed in claim 1, wherein:
a third image frame comprises a plurality of third image macro-blocks, and a fourth image frame comprises a plurality of fourth image macro-blocks,
the selection circuit further selects a plurality of third specific macro-blocks of the third image macro-blocks and a plurality of fourth specific macro-blocks of the fourth image macro-blocks,
the number of third specific macro-blocks is less than the number of third image macro-blocks, and the number of fourth specific macro-blocks is less than the number of fourth image macro-blocks
the buffer circuit stores the third specific image macro-blocks and the fourth specific image macro-blocks,
the calculation circuit calculates differences between the third specific image macro-blocks and the fourth specific image macro-blocks to generate a second calculated result,
the motion judgment circuit determines whether the fourth image frame is the same as the third image frame according to the second calculated result, and
in response to the fourth image frame not being the same as third image frame, the motion judgment circuit wakes up the CPU.

7. The control chip as claimed in claim 6, wherein the buffer circuit comprises:
a first scratch memory configured to store the first specific image macro-blocks and the third specific image macro-blocks; and
a second scratch memory configured to store the second specific image macro-blocks and the fourth specific image macro-blocks.

8. The control chip as claimed in claim 7, further comprising:
a control circuit directing the first scratch memory to successively output the first specific image macro-blocks and directing the second scratch memory to successively output the second specific image macro-blocks,
wherein:
in response to the first scratch memory outputting a first specific block of the first specific image macro-blocks, the second scratch memory outputs a second specific block of the second specific image macro-blocks, and
the position of the first specific block in the first image frame is the same as the position of the second specific block in the second image frame.

9. The control chip as claimed in claim 6, wherein the positions of the third specific image macro-blocks in the third image frame are different from the positions of the first specific image macro-blocks in the first image frame.

10. The control chip as claimed in claim 6, wherein the number of first specific image macro-blocks is equal to the number of second specific image macro-blocks, the number of third specific image macro-blocks is equal to the number of fourth specific image macro-blocks, and the number of first specific image macro-blocks is not equal to the number of third specific image macro-blocks.

11. The control chip as claimed in claim 1, wherein:
the first calculated result comprises a plurality of first difference values,
one of the first difference values is a gray-level difference between a first specific block of the first specific image macro-blocks and a second specific block of the second specific image macro-blocks, and
the position of the first specific block in the first image frame is the same as the position of the second specific block in the second image frame.

12. The control chip as claimed in claim 11, wherein:
the motion judgment circuit determines whether each of the first difference values exceeds a first threshold value,
in response to one of the first difference values exceeding the first threshold value, the motion judgment circuit increases a count value,
the motion judgment circuit determines whether the count value exceeds a second threshold value,
in response to the count value exceeding the second threshold value, the motion judgment circuit wakes up the CPU.

13. A dynamic image judgment method applied in a CPU during a low-power mode, comprising:
receiving a first image frame and a second image frame, wherein the first image frame comprises a plurality of first image macro-blocks, the second image frame comprises a plurality of second image macro-blocks;
comparing a plurality of first specific image macro-blocks of the first image macro-blocks and a plurality of second specific image macro-blocks of the second image macro-blocks to determine whether the second image frame is the same as the first image frame; and
waking up the CPU so that the CPU exits the low-power mode in response to the second image frame not being the same as the first image frame,
wherein the number of first specific macro-blocks is less than the number of first image macro-blocks, and the number of second specific macro-blocks is less than the number of second image macro-blocks.

14. The dynamic image judgment method as claimed in claim 13, further comprising:
converting a first image to generate a first gray-level image;
converting a second image to generate a second gray-level image;
reducing the amount of data in the first gray-level image to generate the first image frame; and
reducing the amount of data in the second gray-level image to generate the second image frame.

15. The dynamic image judgment method as claimed in claim 13, wherein the step of comparing some of image macro-blocks of the first image frame and some of image macro-blocks of the second image frame comprises:
selecting the first specific macro-blocks of the first image macro-blocks of the first image frame;
selecting the second specific macro-blocks of the second image macro-blocks of the second image frame;
calculating differences between the first specific image macro-blocks and the second specific image macro-blocks to generate a first calculated result;
determining whether the second image frame is the same as the first image frame according to the first calculated result; and
enabling a flag to wake up the CPU in response to the second image frame not being the same as the first image frame.

16. The dynamic image judgment method as claimed in claim 15, wherein the positions of the first specific image macro-blocks in the first image frame are the same as the positions of the second specific image macro-blocks in the second image frame.

17. The dynamic image judgment method as claimed in claim 16, further comprising:

receiving a third image frame and a fourth image frame, wherein the third image frame comprises a plurality of third image macro-blocks, the fourth image frame comprises a plurality of fourth image macro-blocks;

selecting a plurality of third specific macro-blocks of the third image macro-blocks of the third image frame;

selecting a plurality of fourth specific macro-blocks of the fourth image macro-blocks of the fourth image frame;

calculating differences between the third specific image macro-blocks and the fourth specific image macro-blocks to generate a second calculated result;

determining whether the fourth image frame is the same as the third image frame according to the second calculated result; and enabling the flag in response to the fourth image frame not being the same as the third image frame.

18. The dynamic image judgment method as claimed in claim 17, wherein:

the positions of the third specific image macro-blocks in the third image frame are the same as the positions of the fourth specific image macro-blocks in the fourth image frame, the positions of the first specific image macro-blocks in the first image frame are different from the positions of the third specific image macro-blocks in the third image frame.

19. The dynamic image judgment method as claimed in claim 15, wherein:

the first calculated result comprises a plurality of first difference values, one of the first difference values is a gray-level difference between a first specific block of the first specific image macro-blocks and a second specific block of the second specific image macro-blocks, and the position of the first specific block in the first image frame is the same as the position of the second specific block in the second image frame.

20. The dynamic image judgment method as claimed in claim 19, wherein the step of determining whether the second image frame is the same as the first image frame according to the first calculated result comprises:

determining whether each of the first difference values exceeds a first threshold value;

increasing a count value in response to one of the first difference values exceeding the first threshold value; and determining whether the count value exceeds a second threshold value, wherein in response to the count value exceeding the second threshold value, it is determined that the second image frame is not the same as the first image frame.

* * * * *